United States Patent
Schumachers et al.

(10) Patent No.: US 10,224,837 B2
(45) Date of Patent: Mar. 5, 2019

(54) METHOD FOR STARTING A DRIVE MOTOR OF AN AUXILIARY ASSEMBLY OF A MOTOR VEHICLE, AND DRIVE MOTOR OF AN AUXILIARY ASSEMBLY OF A MOTOR VEHICLE

(71) Applicant: PIERBURG PUMP TECHNOLOGY GMBH, Neuss (DE)

(72) Inventors: Martin Schumachers, Schwalmtal (DE); Mario Jansen, Meerbusch (DE); Joachim Mertens, Wiesentheid (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 24 days.

(21) Appl. No.: 15/503,406

(22) PCT Filed: Aug. 14, 2014

(86) PCT No.: PCT/EP2014/067425
§ 371 (c)(1),
(2) Date: Feb. 13, 2017

(87) PCT Pub. No.: WO2016/023588
PCT Pub. Date: Feb. 18, 2016

(65) Prior Publication Data
US 2017/0244342 A1    Aug. 24, 2017

(51) Int. Cl.
*H02P 1/46* (2006.01)
*H02P 6/21* (2016.01)
(Continued)

(52) U.S. Cl.
CPC ............... *H02P 1/46* (2013.01); *B60K 25/00* (2013.01); *B60L 1/003* (2013.01); *B60R 16/03* (2013.01);
(Continued)

(58) Field of Classification Search
CPC .... H02P 6/20; H02P 7/05; H02P 27/06; H02P 21/22; H02P 29/00; H02P 1/46;
(Continued)

(56) References Cited

U.S. PATENT DOCUMENTS

| 5,814,957 A | 9/1998 | Yoshida |
| 6,342,770 B1 | 1/2002 | Stephan et al. |

(Continued)

FOREIGN PATENT DOCUMENTS

| DE | 199 36 755 A1 | 2/2001 |
| EP | 1 076 408 A2 | 2/2001 |

(Continued)

*Primary Examiner* — Thai Dinh
(74) *Attorney, Agent, or Firm* — Norman B. Thot (57) ABSTRACT

A method for starting a drive motor. The drive motor includes a motor stator with stator coils and a motor rotor, and a control electronics system and a power electronics system which supply power to the stator coils with a predefined coil voltage and a predefined constant start-up rotation frequency to generate a rotating field to drive the motor rotor. The method includes supplying power to at least one stator coil with a coil voltage corresponding to a start value, increasing the coil voltage in steps, monitoring an electric current flowing through the power electronics system, and, when a specific minimum voltage drop is detected, terminating the increasing of the coil voltage in steps, and performing a safety increase of the coil voltage by increasing a start-up voltage value by a predefined safety value to a first operating voltage value where the motor rotor is drivable in an unregulated mode.

8 Claims, 4 Drawing Sheets

(51) Int. Cl.
  *B60K 25/00*  (2006.01)
  *B60L 1/00*   (2006.01)
  *B60R 16/03*  (2006.01)
  *H02P 6/20*   (2016.01)
(52) U.S. Cl.
  CPC ............... *H02P 1/465* (2013.01); *H02P 6/20* (2013.01); *H02P 6/21* (2016.02)
(58) Field of Classification Search
  CPC .... H02P 6/14; B60L 2220/16; B60L 11/1803; B60L 2240/547; B60L 2240/549
  See application file for complete search history.

(56) References Cited

U.S. PATENT DOCUMENTS

| | | | | |
|---|---|---|---|---|
| 6,703,807 | B2* | 3/2004 | Sakata | H02P 1/46 318/700 |
| 6,885,163 | B2* | 4/2005 | Heidrich | H02P 6/185 318/400.11 |
| 7,122,980 | B2* | 10/2006 | Kuroshima | H02P 6/182 318/400.11 |
| 7,274,161 | B2* | 9/2007 | Mori | H02P 6/20 318/400.25 |
| 7,489,097 | B2* | 2/2009 | Fu | B60K 6/26 318/400.01 |
| 7,944,163 | B2* | 5/2011 | Okumura | H02P 21/22 318/400.01 |
| 8,018,188 | B2* | 9/2011 | Schwarzkopf | H02P 6/182 318/254.1 |
| 8,159,162 | B2* | 4/2012 | Kanamori | H02P 6/20 318/400.11 |
| 9,000,696 | B2* | 4/2015 | Sanchez | H02P 6/182 318/400.06 |
| 9,088,237 | B2* | 7/2015 | Sanchez | H02P 6/182 |
| 2009/0251084 | A1 | 10/2009 | Haas et al. | |

FOREIGN PATENT DOCUMENTS

| | | |
|---|---|---|
| EP | 2 107 677 A2 | 10/2009 |
| EP | 2 343 797 A2 | 7/2011 |
| JP | 8-107693 A | 4/1996 |
| JP | 11-325553 A | 11/1999 |
| JP | 2000-253691 A | 9/2000 |
| JP | 2000253691 A * | 9/2000 |
| JP | 2007-336626 A | 12/2007 |

* cited by examiner

METHOD FOR STARTING A DRIVE MOTOR OF AN AUXILIARY ASSEMBLY OF A MOTOR VEHICLE, AND DRIVE MOTOR OF AN AUXILIARY ASSEMBLY OF A MOTOR VEHICLE

CROSS REFERENCE TO PRIOR APPLICATIONS

This application is a U.S. National Phase application under 35 U.S.C. § 371 of International Application No. PCT/EP2014/067425, filed on Aug. 14, 2014. The International Application was published in German on Feb. 18, 2016 as WO 2016/023588 A1 under PCT Article 21(2).

FIELD

The present invention relates to a method for starting an electronically commutated, brushless drive motor of an auxiliary assembly of a motor vehicle (drive motor), in particular a DC motor of a fluid pump. The present invention further relates to a drive motor of an auxiliary assembly of a motor vehicle with a device for starting the drive motor of an auxiliary assembly of a motor vehicle.

BACKGROUND

Drive motors of an auxiliary assembly of a motor vehicle, in particular BLDC motors or EC motors, have previously been described. Such drive motors generally comprise a motor stator with at least one stator coil and a motor rotor that is provided with at least one permanent magnet or which is itself permanent-magnetic, wherein the stator coil is configured to be energized with a predefined coil voltage and a predefined constant start-up rotation frequency by a control electronics system and a power electronics system to generate a rotating exciter field to drive the motor rotor. By energizing the stator coil or a plurality of stator coils in a certain pattern, it is possible to generate a rotating field, for example, by a multi-phase and/or a multi-strand coil system set configured as a star or a delta connection, by which field the permanently magnetic motor rotor can be "taken along" or driven. This directed energizing of the coils or the commutation of the coil voltage is effected through a directed switching of power semiconductors.

The term coil voltage as used herein refers to a voltage pulse or to an effective voltage generated by a clocking of a DC supply voltage according to a duty cycle, for example, at a frequency of several kHz. The duty cycle indicates the ratio of an activation time or of drive pulses to a period duration of the cyclic control and thereby determines the effective voltage that can be applied to the stator coil in this manner. The clocking is performed using a control electronics system and/or a power electronics system. The control electronics system can thus drive the power electronics system with a defined duty cycle to control the drive motor with a variable power corresponding to a pulse width modulation. A control starts, for example, with a duty cycle of 22/250 which corresponds to about 10% of the supply voltage. A DC supply voltage of 12 volt can thereby be clocked to a much lower effective voltage applied to the coil, namely 1.2 volt. A maximum coil voltage can be reached by a non-clocked transmission of the DC supply voltage to the stator coil by the power electronics system.

It is necessary for the rotating field to be matched with the position or movement of the motor rotor to start-up or start the drive motor. The rotor position may be determined either by a sensor or in a sensor-less manner therefor, for example, by a voltage reinduced in the stator coils. Due to the very small reinduced signals, however, such a measurement generally fails at a standstill or at very low rotational speeds of the motor rotor which is the case when starting up the drive motor of an auxiliary assembly of a motor vehicle. The determination of the rotor position therefore generally requires a minimum rotational speed of about 10% of the maximum rotational speed of the rotor.

In known methods, to start-up such a drive motor, at least up to a minimum rotational speed, the stator coils are therefore energized with a defined, generally very high start-up voltage value to guarantee a start-up of the motor rotor under all circumstances. In particular with regard to boundary conditions which may influence a start-up of the rotor such as temperature, load, or friction, a coil voltage is predefined for the start process that is so high that a magnetic force field of such a magnitude is generated that the motor rotor would only fail to start if a mechanical blocking of the motor rotor existed. The motor rotor would start in all other cases.

After the start-up of the motor rotor, the stator coils are controlled in an unregulated manner or "blindly" according to a rigid pattern scheme or at a defined rotation frequency until the motor rotor has reached a minimum rotational speed and the signal reinduced in the coils is measurable to determine the rotor position so that a sensorless detection of the rotor position is possible. It is then possible to switch to the regulated commutated operation.

A distinction must therefore be made between a first start phase, in which the motor rotor is caused to rotate from a standstill, and a second start phase, in which the motor rotor has reached a minimum rotational speed and the drive motor can thus transition to a regulated mode. The present invention exclusively relates to the above-mentioned first start phase.

A method for starting a DC motor is described in DE 199 36 755 A1 in which, for the start-up of the motor rotor, the stator coils are driven "blindly" according to a rigid pattern, wherein the coils are energized with such a high coil voltage that the rotor, provided the rotor is not blocked, would start in any case. The rotation of the rotor is then detected in a sensorless manner using a voltage reinduced in the coils so that a regulation of the energizing of the coils can be performed via a microcontroller. The motor is deactivated if a start-up of the rotor is detected.

Such a highly over-excited control of the coils for a start of the rotor leads to a high power consumption due to the great proportion of reactive power, so that the efficiency of the drive motor of an auxiliary assembly of a motor vehicle is ultimately reduced. An over-excited activation leads to an increased power loss or loss in efficiency in the case of a low load being applied or of a relatively free-running motor rotor that would already start at a very low coil voltage.

SUMMARY

An aspect of the present invention is to provide a method which allows an energy-saving, effective and safe starting or start-up of an electronically commutated, brushless drive motor of an auxiliary assembly of a motor vehicle. An aspect of the present invention is additionally to provide a device with which such a method can be performed.

In an embodiment, the present invention provides a method for starting a drive motor of an auxiliary assembly of a motor vehicle. The drive motor is configured to be electronically commutated and brushless. The drive motor includes a motor stator comprising at least one stator coil and a permanent-magnet motor rotor, and a control electronics system and a power electronics system which are configured to supply power to the at least one stator coil with a predefined coil voltage and a predefined constant start-up rotation frequency so as to generate a rotating field so as to drive the permanent-magnet motor rotor. The method includes supplying the power to the at least one stator coil with a coil voltage which corresponds to a start value, increasing the coil voltage in steps, monitoring an electric current flowing through the power electronics system, and, when a voltage drop by a minimum value is thereby detected, terminating the increasing of the coil voltage in steps, and performing a safety increase of the coil voltage by increasing a start-up voltage value, which is applied to the at least one stator coil during the termination operation, by a predefined safety value to a first operating voltage value at which the motor rotor can be driven in an unregulated mode.

BRIEF DESCRIPTION OF THE DRAWINGS

The present invention is described in greater detail below on the basis of embodiments and of the drawings in which.

DETAILED DESCRIPTION

In an embodiment of the present invention, the method for starting an electronically commutated, brushless drive motor of an auxiliary assembly of a motor vehicle comprises the following steps:

Energizing the stator coil with a coil voltage that corresponds to a first predefined start value. The start value or start voltage value may be a minimal effective voltage value, by which a first pulse for an alignment or a turning of the rotor may be applied, but which would not yet cause the motor rotor to start or be taken along. The start voltage value is variable and can be set or adjusted anew for each start operation.

The coil voltage applied to the stator coil and/or the coil voltage value is increased in steps by a predefined voltage difference value, respectively. The stepwise increase is performed in a continuous and abrupt manner. "Stepwise" here means that the voltage is kept constant at least for a certain time between two phases of increase. In this context, "continuous" means that the coil voltage applied to the coil does not fall to zero between two phases of increase, but remains continually excited and is abruptly increased by the predefined voltage difference value in a defined time interval. The step-wise increase of the coil voltage may be performed in a rigid manner following a predefined pattern, for example, as a function of time, wherein the control of the drive motor is performed "blindly" in this case. As the coil voltage is increased, the rotor may be caused to start a so-called "toggling" in which the motor rotor performs a reciprocating movement between two stator coils. The rotor is unstable in this state and a thermal heating of the drive motor may be caused by the increase in current flow.

An electric current flowing into or through the power electronics system is monitored or measured during the start operation. When the current is monitored, a respective first current value is compared to a respective second current value. The current course and in particular variations or leaps in the current course can thereby be detected. The variations in the current course are comparatively large changes in the current course and may either be a current increase, directed towards a higher current flow, or a current decrease, directed towards a lower current flow. Monitoring the electric current may be performed continuously for at least the period of the start operation. Monitoring can, for example, be performed over the entire period of energizing the stator coil.

Upon detection of a voltage drop from a first current value to a lower second current value by a minimum value, the motor rotor may be at a tilting point and begin to follow the rotating field generated by the coils and to perform a rotary movement in one direction. The current reduction is caused by a reinduced voltage in the coil. A current drop by a minimum value is accordingly judged to be indicative of a start-up of the rotor. The motor rotor can be started either from the so-called "toggling" or directly from a standstill of the motor rotor. The detection of the decreasing current is in particular performed by comparing a first current value to a second current value. A detection of a current drop will be triggered only when a minimum value is reached or when a threshold value between the first current value and the second current value is exceeded. For this purpose, a comparison of a respective measured current value or a current difference value to a reference threshold value may be performed. Detecting and/or comparing the current drop can, for example, be performed by a current monitoring electronics system and/or a control electronics system. In the present context, the so-called "start-up voltage" is the coil voltage applied at the time the current drop is detected and/or of the rotor start-up and/or the coil voltage value.

After detection of the current drop, the step-wise increase is terminated and is followed by a single further increase, a so-called "safety increase", of the start-up voltage value applied to the stator coil at the time of termination, the value being increased by a predefined safety value. After the safety increase, the coil voltage has a first operation voltage value at which the motor rotor can be driven in an unregulated mode, or at which the drive motor can be operated in an unregulated mode. The predefined safety value can, for example, be another difference value than the voltage difference value predefined before for the step-wise increase of the coil voltage. The safety value can in particular be greater than the voltage difference value for the step-wise increase. The predefined safety value may be specific to the respective application.

This method allows the time and/or the coil start-up voltage value to be detected upon the start-up of the rotor and to use the information obtained therefrom for the control and regulation of the drive motor of an auxiliary assembly of a motor vehicle. A first operation voltage for the unregulated mode can in particular be set based thereon. The start of the drive motor can thus be performed under any boundary conditions with a motor voltage adapted to the operating condition, whereby the energy consumption of the drive motor in this phase can be reduced significantly. The detection of the current drop also allows for a clear and safe determination of whether the motor rotor is performing a rotation or whether it is blocked. The components of the power electronics system and the coils are also exposed to less thermal stress in the unregulated mode.

After the safety increase of the coil voltage to the first operation voltage value, the first operation voltage value can, for example, be maintained until the control electronics system can switch from the unregulated to a regulated mode. Switching to the regulated mode is possible when the motor rotor has reached a minimum rotational speed at which the signals reinduced in the stator coils are sufficiently large for a measurement of the rotor position. As a consequence, an operation voltage value can, for example, be applied at the coil until the motor rotor has run up to a minimum rotational speed. The drive motor can then be driven in the regulated mode. As an alternative, after the safety increase, it is possible to perform a first operation increase of the coil voltage to a second operation voltage value by a predefined operation voltage difference value so that the run-up of the motor rotor is accelerated. This approach also allows for a switching to the regulated mode after the minimum rotational speed of the rotor has been reached.

The step-wise increase of the coil voltage can, for example, be terminated and/or the voltage value reduced if the monitored electric current flowing through the power electronics system exceeds a predefined maximum value. Exceeding a maximum current value in this case can be judged to be indicative of a blocking of the motor rotor.

In an embodiment of the present invention, prior to energizing the stator coil with the start voltage value, a test and/or setting voltage pulse for aligning the motor rotor with respect to the stator coil can, for example, be applied to the stator coil. At the test pulse, the motor can, for example, remain stationary, while at the setting pulse, the motor rotor can, for example, be moved into a defined position relative to the stator coil. The rotor may in particular be turned towards a stator coil and be aligned so that a sense of rotation of the motor rotor can also be predefined. The motor rotor does not make a full turn in this situation.

After the detection of a current drop, at least one memory voltage value can, for example, be stored which is equal to or greater than the start-up voltage value. The start-up voltage value is the voltage value that is present at the stator coil when the current drop or the start-up of the rotor is detected. It is thus possible to store a coil voltage value at which, given the same boundary conditions, the motor rotor would start up. Storage can be made in the form of a data entry in a memory module such as a random access memory of a microprocessor. Besides the storage of the memory voltage value, it is possible to store further voltage values, for example, the initial start voltage and/or the operation voltage. Boundary conditions and/or other data can also be stored, in particular operation times and/or operation temperatures. The memory voltage value for a certain operation point, i.e., the time of a safe rotor start-up, can thus be detected and, for example, be stored for maintenance and revision purposes and/or for use in subsequent start operations.

In an embodiment of the present invention, the stored memory voltage value can, for example, be read out and/or used as the start voltage value in at least one subsequent start operation of the drive motor so that the first energizing of the stator coil is performed using the stored memory voltage value. The memory voltage value is in particular used as a start voltage value in such start operations which have the same boundary conditions, for example, the same temperature. If a memory voltage value is used as the start voltage, the step-wise increase of the start voltage can be suspended for at least one step or for the entire start operation. The start voltage is thereby applied to the coil over a certain time, whereby the rotating field can cause the motor rotor to move, in particular to rotate. In an embodiment of the present invention, the applied start voltage corresponding to a memory voltage can, for example, remain applied to the stator coil for the entire unregulated mode of the drive motor.

Storing the memory voltage value can further be used to adjust an operation characteristic of the drive motor, for example, a U/f characteristic. The data obtained may in particular be used to prepare an optimized characteristic diagram which may be used in subsequent start operations.

According to the present invention, the drive motor of an auxiliary assembly of a motor vehicle, which comprises a motor stator having at least one stator coil and a motor rotor provided with at least one permanent magnet or being permanent-magnetic, comprises a device for starting an electric drive motor of an auxiliary assembly of a motor vehicle. The starting device comprises at least a power electronics system, a current monitoring electronics system, and a control electronics system.

According to the present invention, the power electronics system is adapted to apply an electric coil voltage with a variable voltage value to the stator coil. The power electronics system can be controlled by the control electronics system for this purpose. The power electronics system can in particular be controlled by the control signal so that the coil voltage value applied to the stator coil for generating the rotating field for a start-up or run-up of the rotor is increased or, as an alternative, for example, when a maximum current value is detected, decreased or switched off. The power electronics system can thereby apply a coil voltage to the stator coil that is variably adjustable or clocked within a defined value range. The coil voltage is in particular varied by changing a clocking in correspondence with a duty cycle. The resulting effective voltage that can be applied to the stator coil may be significantly lower than the supply voltage of the power electronics system. The power electronics system may comprise at least one power semiconductor for this purpose. The value range may extend from a minimum coil voltage, for example, a test or setting voltage for aligning the motor rotor, to a maximum coil voltage at which the drive motor can be operated under full load. The maximum coil voltage can correspond to the supply voltage of the power electronics system.

The current monitoring electronics system for monitoring an electric current flowing through the power electronics system is configured to detect, at the power electronics system, a decreasing current or a current drop from a first current value to a lower second current value. For this purpose, the current monitoring electronics system may comprise a current sensor or a current measuring circuit by which the current flowing though the power electronics can be detected continuously. After the detection of a current drop, the current monitoring electronics system can, for example, output a signal to the control electronics system. It is further possible that the current monitoring electronics system be integrated in the control electronics system.

The control electronics system is connected with the power electronics system and with the current monitoring electronics system for the control and regulation of the coil voltage. The control electronics system can thus control the power electronics system so that the coil voltage applied to the stator coil is applied, increased or decreased. Controlling the power electronics system may be performed as a function of a predefined signal, for example, a signal for starting the drive motor. The signal may further be a measuring signal of an electric current detected by the current monitoring electronics system so that the control electronics system controls the power electronics system depending on the electric current. For example, when detecting a current drop, the control electronics system can control the power electronics system so that a step-wise increase of the coil voltage is terminated, a voltage value at the coil (in particular a start-up voltage value) is detected, and the coil voltage is increased once by a safety voltage value. For a control of the power electronics system, the control electronics may comprise a start-up pattern generator for generating and/or adjusting an operation characteristic. The control electronics may in particular be configured as a microprocessor.

In an embodiment of the present invention, a store and read module can, for example, be provided for storing and/or reading at least one coil voltage value, in particular, a so-called memory voltage value. The memory voltage value can thus be used for purposes of maintenance, analysis, or for a subsequent start. The store and read module may be a permanent memory or be a temporary memory, such as a random access memory of a microprocessor. The store and read module may be adapted to store a plurality of voltage values or data.

The present invention will be described below in more detail with reference to the drawings.

Figure 1:
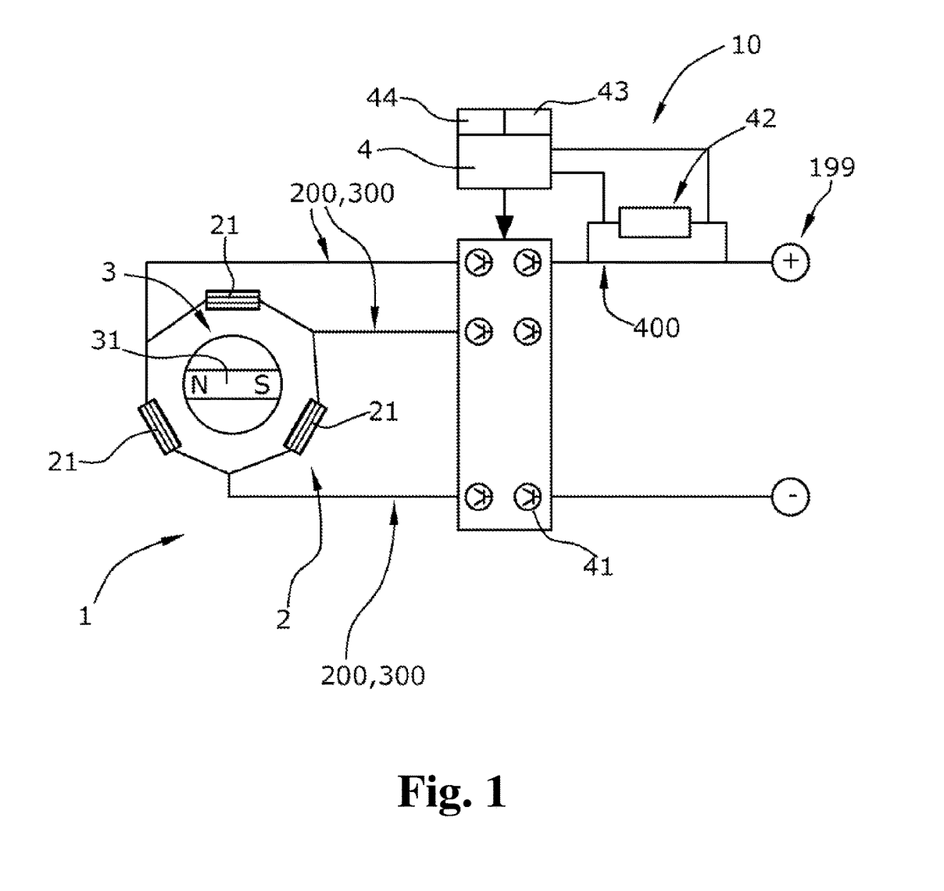
FIG. 1 schematically illustrates a drive motor of an auxiliary assembly of a motor vehicle with a device for starting the drive motor.

FIG. 1 schematically illustrates a drive motor 1 of an auxiliary assembly of a motor vehicle with a device 10. The drive motor 1 comprises a motor stator 2 and a motor rotor 3. The motor rotor 3 may be connected to a (non-illustrated) pump wheel of a (non-illustrated) fluid pump via a (non-illustrated) shaft. The motor stator 2 of the drive motor 1 has three energizable stator coils 21. The motor rotor 3 has a permanent magnet 31 with a north pole N and a south pole S. For controlling or energizing the stator coils 21, the drive motor 1 comprises a control electronics system 4 with a power electronics system 41 that is configured to energize the stator coils 21 with a defined coil voltage 200 and a start-up rotation frequency 300, wherein the coil voltage value 201, 200a, 202, 200b, 200c, 203, 204 can be set. The settable coil voltage values 201, 200a, 202, 200b, 200c, 203, 204 are stored in a memory 43, for example, a store and read module, of the control electronics system 4 and can be retrieved therefrom.

The adjustable coil voltage 200 applied to the stator coil 21 is obtained in particular by clocking a supply voltage 199 of the drive motor 1 in a power electronics system 41, for example, with a frequency of several kHz and a predefined duty cycle. For this purpose, the control electronics system 4 can control the power electronics system 41 with a defined duty cycle, for example, a control starts with a start duty cycle of 22/250 which is about 10% of the supply voltage 199.

A current monitoring electronics system 42 is provided at the drive motor 1 for monitoring 540 an electric current 400 flowing through the power electronics system 41. The current monitoring electronics system 42 is configured as a current measurement circuit with a low-resistance measuring resistor between a voltage source and a load. The electric current 400 can be determined by establishing a relation. The current monitoring electronics system 42 is configured to detect, at the power electronics system 41, a decreasing current or a current drop 403 from a first current value 401 to a lower second current value 402.

For controlling the power electronics system 41, the control electronics system 4 has a start-up pattern generator module 44 which is configured to define a control pattern for energizing the stator coils 21. The control electronics system 4 is connected with the power electronics system 41 and the current monitoring electronics system 42 so as to control the power electronics system 41, for example, in dependence on a detection 541 of a current drop 403, so that the voltage value 201, 200a, 202, 200b, 200c, 203, 204 applied to the stator coil 21 is increased or decreased.

Figure 2:
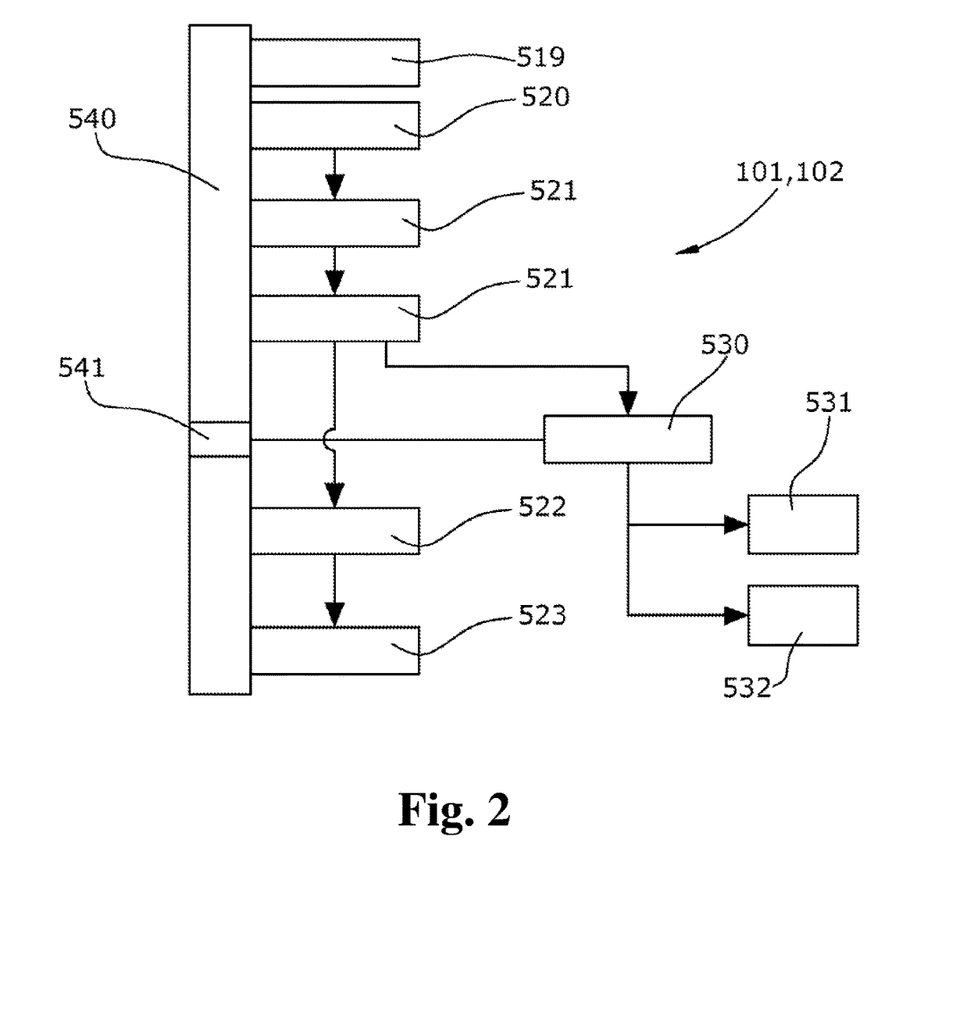
FIG. 2 schematically shows a flow diagram to illustrate the method for starting a drive motor of an auxiliary assembly of a motor vehicle.

FIG. 2 shows a flow diagram to illustrate the method for start-up 101, 102 of a drive motor 1 of an auxiliary assembly of a motor vehicle, with which method it is possible to detect a start-up of the rotor 3. For this purpose, a setting voltage pulse is applied to the stator coil 21 in a first step 519 so as to align the motor rotor 3 towards a stator coil 21.

In a second step 520, a coil voltage 200 having a first predefined start voltage value 201 is applied to the stator coil 21. The pulse of the start voltage value 201 has such a low value that the motor rotor 3 does not yet start to rotate.

In a third step 521, the coil voltage 200 applied to the stator coil 21 is increased by a predefined voltage difference value 200a. The coil voltage 200 applied to the stator coil 21 is thus increased by the voltage difference value 200a. The voltage difference value 200a is predefined and, in the present case, is stored in a memory 43 from where it can be retrieved. Third step 521 is repeated or the coil voltage 200 is increased by the voltage difference value 200a until a current drop 403 from a first current value 401 to a lower second current value 402 is detected. For this purpose, the electric current 400 flowing in the power electronics system 41 is monitored 540 during the entire start operation 101, 102.

The detection of a current drop 403 is performed in step 541. This may be effected, for example, by a continuous comparison of the first current value 401 and the subsequent second current value 402. The current difference value 400a, which is between the first current value 401 and the second current value 402, is compared in the present instance with a threshold value stored in the memory 43. A signal is generated in the control electronics system 4 for controlling the power electronics system 41 when the stored threshold value is exceeded. The motor rotor 3 starts up at the moment of the current drop 403.

In the shown embodiment of the present invention, the start-up voltage value 202 which is applied at the time the current drop 403 is detected 541 is stored in a memory 43. This is done in a sixth step 530. In a subsequent start operation 102 of the drive motor 1, the start-up voltage value 202 stored in the memory 43 is read out or retrieved from the memory 43 in seventh step 531 and is used as the start voltage value 201, optionally with an additional safety margin.

This process for starting up the rotor 3, described for the above steps, can be performed for different operation points and can be stored in an operation characteristic or an operation characteristic diagram and/or can be performed anew at each start operation 101, 102. The optimum of the power consumption of the drive motor 1 can be reached then or after a further, single, increase of the coil voltage 200 by a predefined safety value 200b to a first operation voltage value 203, as is provided for in the fourth step 522. At the first operation voltage value 203, the drive motor 1 is controlled in an unregulated mode. In the shown embodiment of the present invention, a further operational increase of the coil voltage 200 is performed in a fifth step 523 until the drive motor 1 can transition to a regulated mode.

Figure 3:
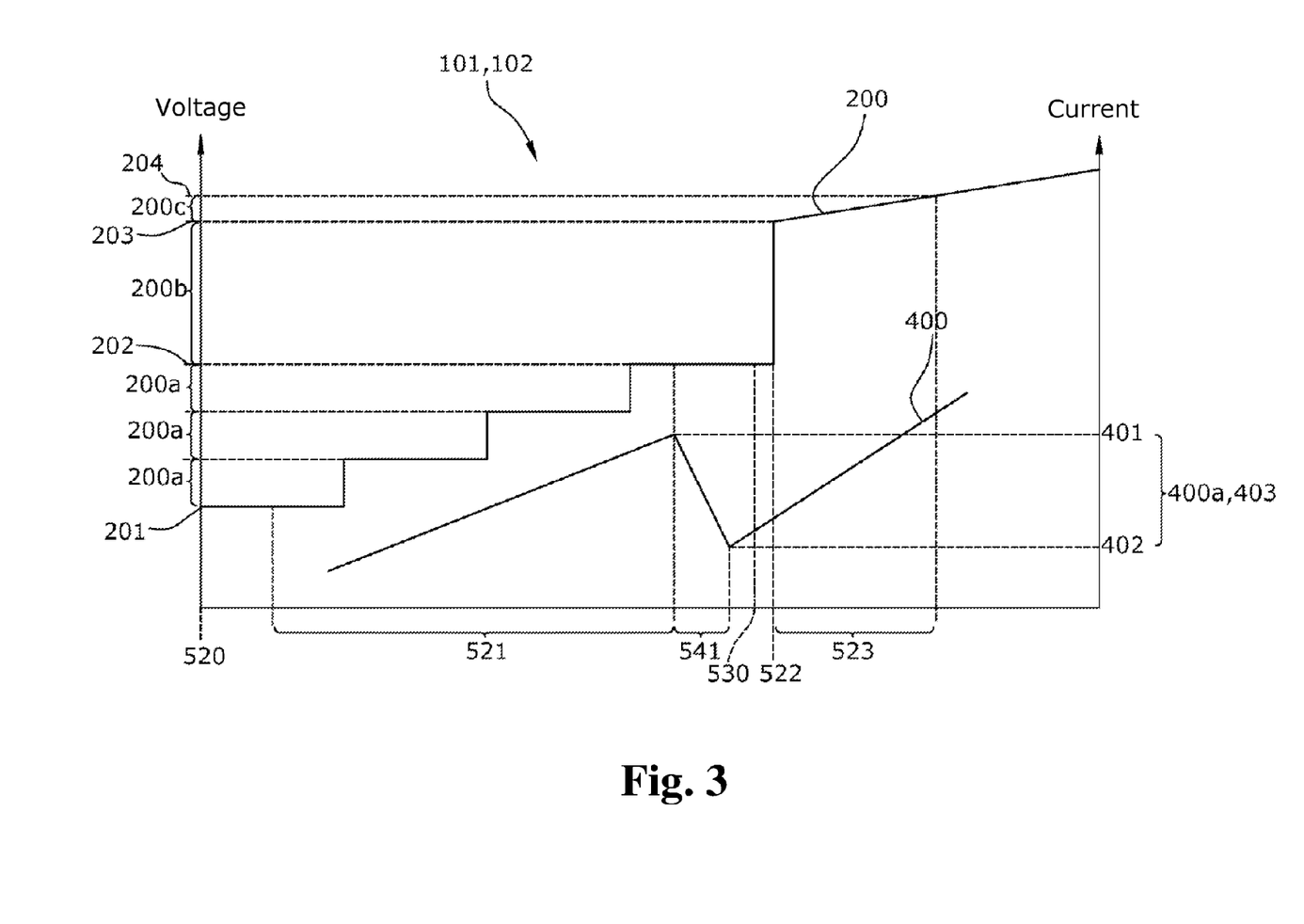
FIG. 3 schematically illustrates a diagram of the current/voltage characteristic upon a first start-up of a drive motor of an auxiliary assembly of a motor vehicle.

FIG. 3 illustrates a diagram of the current/voltage characteristic upon a start-up 101, 102 of the drive motor 1 of an auxiliary assembly of a motor vehicle. The curve diagram in particular shows the temporal course of the coil voltage 200 applied to a stator coil 21, as well as of the electric current 400 monitored at the power electronics system 41. It can clearly be seen how the coil voltage 200 is continuously increased from the start voltage value 201 by a respective voltage difference value 200a. The electric current 400 also increases with the step-wise increase of the coil voltage 200. At a certain point at which the coil voltage 200 has reached the start-up voltage value 202, the electric current 400 drops abruptly and starts to remain on a lower level or, as in the present instance, to rise again. This point is the tilting point of the drive motor 1 at which the motor rotor 3 starts to follow the rotating field generated by the stator coils 21.

The coil voltage 200 is then again increased by a safety value 200b to a first operation voltage 203 at which the drive motor 1 continues to start up in the unregulated mode. In this state, the motor rotor 3 reliably follows a rotating field that is generated by rigidly or blindly controlling the stator coils 21 according to a predefined pattern.

In the shown embodiment of the present invention in FIG. 3, the coil voltage 200 is increased continuously from the first operation voltage value 203 to a second operation voltage value 204 by an operation voltage difference value 200c. A running up of the rotational speed or an acceleration of the motor rotor 3 can be effected corresponding to the increase in voltage 200. When the motor rotor 3 has finally reached a minimum rotational speed at an operation coil voltage 204, it may be possible to measure the rotor position, and the operation of the drive motor 1 can transition from the unregulated mode to a regulated mode.

Figure 4:
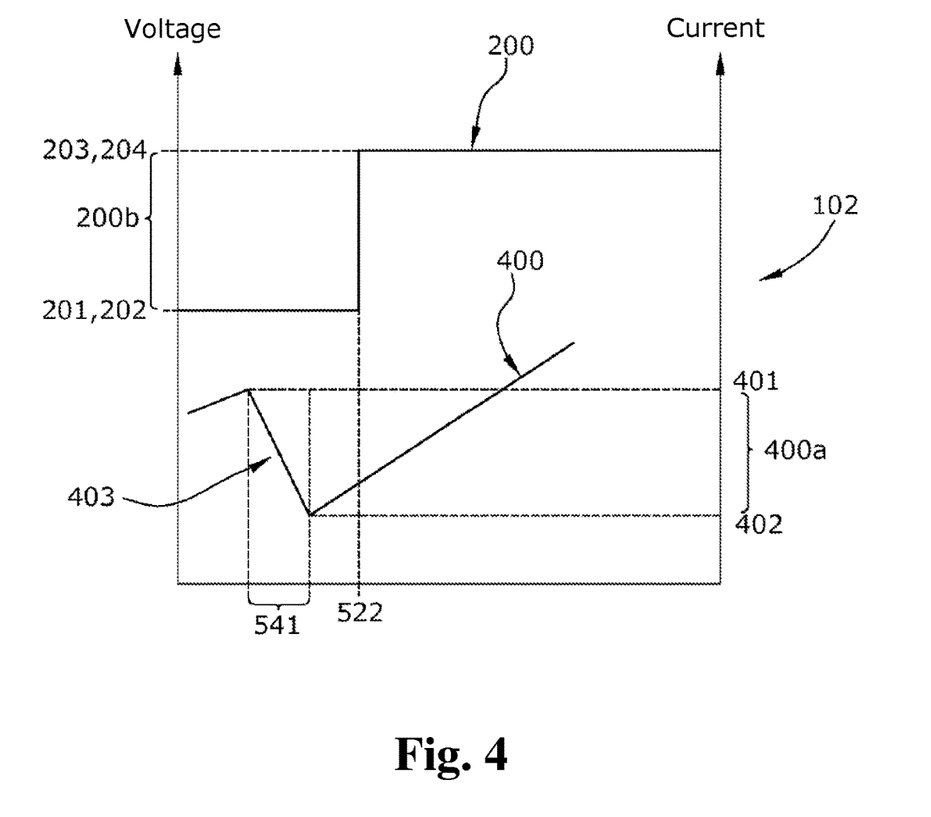
FIG. 4 schematically illustrates a diagram of the current/voltage characteristic upon a subsequent start-up of a drive motor of an auxiliary assembly of a motor vehicle.

FIG. 4 illustrates a diagram of the current/voltage characteristic with a coil voltage 200 and an electric current 400 upon an at least second or subsequent start operation 102 of a drive motor 1 of an auxiliary assembly of a motor vehicle. This means that the drive motor 1 has already passed the start operation 101 illustrated in FIG. 1 and that a memory voltage value has been stored in the memory 43, which value corresponds to the start voltage value 201 of the first start operation 101.

The start-up voltage value 202 is now used in the subsequent start operation 102 in which the start voltage value 201 is equated to the start-up voltage value 202. The first application of a coil voltage 520 of the stator coil 21 is thus performed using the start-up voltage value 202. With this voltage value (memory voltage value 202), the motor rotor 3 can start up directly so that a current drop 403 by a minimum value 400a can be immediately detected 541.

The voltage is increased by a safety value 200b to a respective first operation voltage 203/second operation voltage 204 after detection of the current drop 403. A further increase of the coil voltage 200 is not provided in the embodiment illustrated in FIG. 4 (in contrast to the embodiment illustrated in FIG. 3). In the present instance, at the respective first operation voltage 203/second operation voltage 204, the motor rotor 3 can reach a minimum rotational speed over time so that the drive motor 1 can be switched to the regulated mode.

A coil voltage 200 value may alternatively be used as the start voltage value 201, which voltage value corresponds to the sum of the memory start voltage value 201 and a safety value 200b. The start voltage value 201 thus already includes the safety value 200b. The drive motor 1 can thereby be started directly with the respective first operation voltage value 203/second operation voltage value 204. A current drop 403 does not in this case have to occur, the power consumption immediately following the rotating field of the motor stator 2.

The present invention is not limited to embodiments described herein; reference should be had to the appended claims.

LIST OF REFERENCE NUMERALS

| | |
|---|---|
| 1 | drive motor of an auxiliary assembly of a motor vehicle |
| 10 | device |
| 2 | motor stator |
| 21 | stator coil |
| 3 | motor rotor |
| 31 | permanent magnet |
| 4 | control electronics system |
| 41 | power electronics system |
| 42 | current monitoring electronics system |
| 43 | store and read module |
| 44 | start-up pattern generator module |
| 101 | start-up; start operation |
| 102 | subsequent start operation |
| 199 | supply voltage |
| 200 | coil voltage |
| 201 | start voltage; start voltage value |
| 200a | voltage difference value |
| 202 | start-up voltage; start-up voltage value |
| 200b | safety value |
| 200c | operation voltage difference value |
| 203 | first operation voltage; first operation voltage value |
| 204 | second operation voltage; second operation voltage value |
| 300 | start-up rotation frequency |
| 400 | electric current |
| 401 | first current value; current drop start point; upper current jump value |
| 402 | second current value; current drop end point; lower current jump value |
| 403 | current drop |
| 400a | minimum value; current difference value |
| 519 | first step; application of a setting voltage |
| 520 | second step; application of a coil voltage |
| 521 | third step; step-wise increase of the coil voltage |
| 522 | fourth step; safety increase of the coil voltage |
| 523 | fifth step; operational increase of the coil voltage |
| 530 | sixth step; storage of the voltage value |
| 531 | seventh step; reading out the voltage value |
| 532 | eighth step; adjustment of the operation characteristic |
| 540 | monitoring the electric current |
| 541 | detecting a current drop |

What is claimed is:

1. A method for starting a drive motor of an auxiliary assembly of a motor vehicle, wherein the drive motor is configured to be electronically commutated and brushless, the drive motor comprising:

a motor stator comprising at least one stator coil and a permanent-magnet motor rotor, and a control electronics system and a power electronics system which are configured to supply power to the at least one stator coil with a predefined coil voltage and a predefined constant start-up rotation frequency so as to generate a rotating field so as to drive the permanent-magnet motor rotor, the method comprising:

supplying the power to the at least one stator coil with a coil voltage which corresponds to a start value;

increasing the coil voltage in steps;

monitoring an electric current flowing through the power electronics system, and, when a voltage drop by a minimum value is thereby detected;

terminating the increasing of the coil voltage in steps; and performing a safety increase of the coil voltage by increasing a start-up voltage value, which is applied to the at least one stator coil during the termination operation, by a predefined safety value to a first operating voltage value at which the motor rotor can be driven in an unregulated mode.

2. The method as recited in claim 1, wherein, after performing the safety increase of the coil voltage to the first operation voltage value, method further comprises:
  maintaining the first operation voltage value until the control electronics system switches from the unregulated mode to a regulated mode.

3. The method as recited in claim 1, further comprising:
  terminating the increasing of the coil voltage in steps when the monitored electric current exceeds a maximum value.

4. The method as recited in claim 1, wherein, prior to supplying of the power to the at least one stator coil with the coil voltage which corresponds to the start value, the method comprises:
  energizing the at least one stator coil with a setting voltage pulse to align the motor rotor with respect to the at least one stator coil.

5. The method as recited in claim 1, wherein, when the voltage drop by the minimum value is detected, the method further comprises:
  storing at least one memory voltage value which is equal to or greater than the start-up voltage value.

6. The method as recited in claim 5, further comprising:
  supplying the at least one memory voltage value to the at least one stator coil as the start value in at least one subsequent start operation of the drive motor.

7. The method as recited in claim 5, further comprising, using the at least one memory voltage value to adjust an operation characteristic of the drive motor.

8. The method as recited in claim 7, wherein the operation characteristic of the drive motor is a U/f characteristic.

* * * * *